Patented July 11, 1933

1,917,801

UNITED STATES PATENT OFFICE

MAX ALBERT KUNZ, OF MANNHEIM, AND RUDOLF STROH AND HERMANN DIMROTH, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

9.10 DIAMINO ANTHRACENE AND ITS N-SUBSTITUTION PRODUCTS

No Drawing. Application filed April 8, 1931, Serial No. 528,702, and in Germany December 1, 1928.

The present invention relates to new anthracene derivatives substituted in the 9 and 10 positions.

We have found that 9.10-diaminoanthracene and its substitution products having the following general structure:

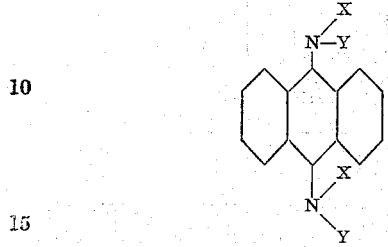

in which X is hydrogen or an acyl group, and Y hydrogen, an acyl or an aryl group in which latter case X must be hydrogen, are for the most part intensively colored compounds suitable as pigments and also as intermediate products for the preparation of dyestuffs. They fluoresce when exposed to ultra-violet rays and are readily decomposed to anthraquinone and its substitution products when heated in sulphuric acid of from 60 to 70 per cent strength with oxidizing agents.

Those of the aforesaid new products as contain an aliphatic carboxylic acid radicle, such as for example a formyl or acetyl radicle, attached to the amino group are best obtained by causing an anthraquinone to react with an aliphatic carboxylic acid amide. This reaction is brought about by heating the reacting components. The unsubstituted 9.10-diformyl di-imino-anthracene obtained in this manner corresponds to the formula

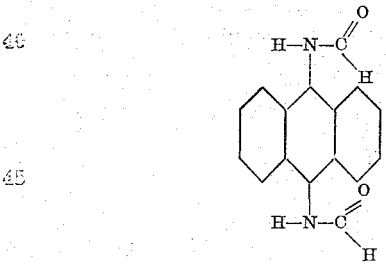

The products obtained by condensation with amides of higher molecular aliphatic acids correspond to the said formula except that alkyl groups are connected to the carbon atoms instead of the hydrogen atoms.

The free 9.10-diaminoanthracenes of the general structure

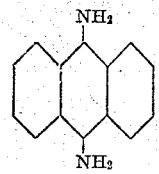

are readily obtained from the aforesaid aliphatic diacyliminoanthracenes by saponification by means of alkaline agents.

9.10-aminoanthracenes in which both hydrogen atoms of the amino groups are replaced by acyl radicles either aliphatic or aromatic, or one hydrogen atom of each of the amino groups are replaced by aryl radicles are readily obtained by causing aromatic amines, organic acid radicles or organic acid anhydrides to react with the aforesaid 9.10-diformyl di-iminoanthracenes. The reaction is brought about by simply heating the components, if desired in an indifferent organic diluent, such as for example nitrobenzene. When employing an aromatic amine as reacting component it is advisable to add small amounts of a salt of an amine, for example aniline hydrochloride, to the reaction mixture, in case an organic acid halide or anhydride is used as reacting component small amounts of an acid binding agent, such as sodium acetate, may be added.

Another method of producing 9.10-diaminoanthracenes in which one hydrogen atom of each amino group is replaced by an aryl group consists in reducing an anthraquinone-9.10-dianil. These latter compounds may be prepared in the manner described in "Liebig's Annalen der Chemie" vol. 396, page 178, or by condensing anthraquinone or a substitution product thereof with a primary aromatic amine with the aid of a condensing metal halide, such as for example aluminium chloride, zinc chloride and the like. The reduction of the aforesaid anthraquinone-9.10-dianils may be carried out in alkaline or acid media. The anthraquinone-9.10-dianils need not be isolated and then reduced, but reducing agents, such as for example zinc dust may be added to the reaction mixture during the condensation of an anthraquinone and a primary aromatic amine with the aid of aluminium chloride and the like.

The following examples will further illustrate the nature of the invention but the invention is not restricted to these examples. The parts are by weight.

*Example 1*

100 parts of anthraquinone and 500 parts of formamide are kept gently boiling, while stirring, for 4 hours. The reaction product is filtered from the hot reaction mixture and washed with water and ethyl alcohol. It is obtained in a yield about 70 to 75% of that required by theory and according to analysis is a 9.10-diformyl di-iminoanthracene corresponding to the formula

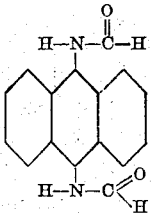

It is a yellow powder insoluble in almost all solvents except in formamide.

By condensation of 2-methylanthraquinone and formamide in the above described manner a product is obtained which is very similar in its properties to that described in the foregoing paragraph.

*Example 2*

1 part of 2-chloroanthraquinone is heated for 6 hours with 10 parts of formamide at between 170° and 175° C. After cooling the yellow reaction product containing chlorine is filtered off. The reaction product is N.N'-diformyl-9.10-diamino-2-chloroanthracene corresponding to the formula

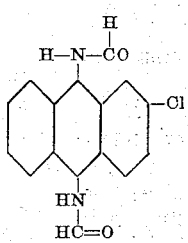

It is practically insoluble in most organic solvents but soluble in a solution of caustic potash in methyl alcohol.

*Example 3*

200 parts of ground caustic potash are dissolved at room temperature in 400 parts of methanol whereupon 60 parts of the product obtained according to Example 1 are introduced into the reaction mixture which is then boiled for one hour. On cooling the product crystallizes in brown red needles which are filtered off. It may be recrystallized from amyl acetate and is most probably 9.10-diaminoanthracene which on heating with sulphuric acid of 70 per cent strength with manganese dioxide is decomposed into anthraquinone.

*Example 4*

2 parts of the product obtained according to Example 1 are dissolved in a solution of 3 parts of caustic potash in 10 parts of methanol, whereupon a solution of 1 part of ammonium chloride in 2 parts of water are added and the reaction mixture kept boiling for 1 hour. On cooling the reaction product separates from the solution. It is 9-N-formyl-9.10-diaminoanthracene corresponding to the formula

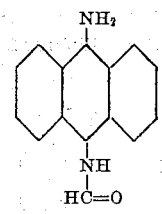

*Example 5*

5 parts of the product obtained from 2-chloroanthraquinone and formamide in the manner described in Example 2 are introduced into a solution of 20 parts of caustic potash in 40 parts of methanol whereupon the reaction mixture is kept boiling for about one hour. On cooling the product separates from the reaction mixture as a red yellow powder. It is most probably the 2-chloro-9.10-diaminoanthracene which may be crystallized from organic solvents such as xylene.

*Example 6*

1 part of the condensation product obtained according to Example 1 is heated to boiling for half an hour with 1 part of aniline hydrochloride and 10 parts of aniline. After cooling the reaction product is filtered off, washed with ethyl alcohol and hot water. The yield amounts to about 120 per cent of the initial material. The product has the form of intensively yellow coloured needles which may be recrystallized from trichlorobenzene and is most probably the 9.10-dianilinoanthracene. The composition of the product is 86.9 per cent C, 5.7 per cent H, and 7.74 per cent N, the calculated composition of 9.10-dianilinoanthracene ($C_{26}H_{20}N_2$) being 86.63 per cent C, 5.60 per cent H and 7.77 per cent N.

*Example 7*

4 parts of the product obtained according to Example 1 are heated at 100° C. with 40 parts of nitrobenzene, whereupon 6 parts of benzoyl chloride are dropped into the reaction mixture which is heated to boiling for one hour. The yellow needles separating from the reaction mixture on cooling dissolve in a solution of caustic potash in methanol to give a brown yellow coloration. According to analysis the product is N.N'-dibenzoyl-9.10-diaminoanthracene corresponding to the formula

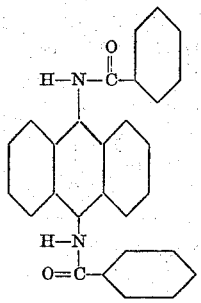

*Example 8*

1 part of the product obtained according to Example 1 is heated for about 2 hours, while stirring, to boiling with 1 part of p-toluidine hydrochloride and 10 parts of p-toluidine. The reaction mixture may be worked up by pouring it into dilute acid or by steam distillation. The residue which may be recrystallized from trichlorobenzene is probably N.N'-9.10-di-p-toluido-anthracene corresponding to the formula

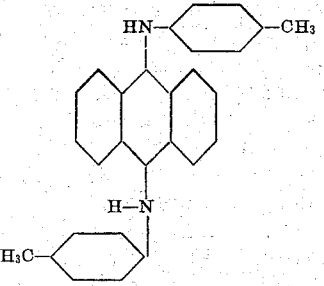

*Example 9*

1 part of the product obtained according to Example 1 is heated to boiling for several hours with 5 parts of acetic acid anhydride. The new compound separates from the reaction mixture on cooling and may readily be recrystallized from glacial acetic acid or chloroform. It shows an intensive blue fluorescence when exposed to ultraviolet light. According to analysis it is N.N'-tetraacetyl-9.10-diamino-anthracene corresponding to the formula

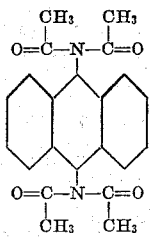

The reaction can be promoted by the addition of 1 part of sodium acetate. In both cases the yields are practically quantitative.

*Example 10*

1 part of the product obtained according to Example 1 is heated to boiling for several hours with 3 parts of phthalic acid anhydride and 6 parts of nitrobenzene. On cooling the reaction product separates out from the reaction mixture as a faintly coloured powder from which unconverted initial material may be extracted by means of solvents, such as for example toluene, benzene and xylene. The product may be recrystallized from nitrobenzene or xylene. Its solutions show a blue fluorescence. It is supposed that the reaction product consists to a substantial degree of 9.10-di-phthalyliminoanthracene corresponding to the formula:

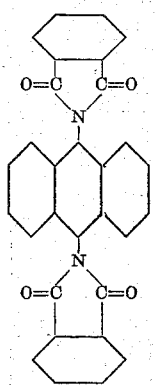

*Example 11*

1 part of the condensation product of 2-chloroanthraquinone and formamide obtained in the manner described in Example 2 is heated to boiling for several hours with 5 parts of acetic acid anhydride. The reaction mixture is worked up by pouring it into water. The product is most probably N.N' tetraacetyl-9.10-diamino-2-chloroanthracene and is very similar to the product described in Example 9. Probably the product corresponds to the formula

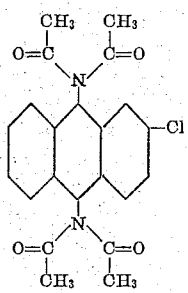

*Example 12*

2 parts of aluminium chloride are introduced while stirring into a suspension of 1 part of anthraquinone in 10 parts of aniline whereupon the reaction mixture is stirred for from 1 to 2 hours at between 50° and 60° C. The reaction mixture is freed from the excess of aniline by means of an alkaline steam distillation. The reaction product is then filtered off and may further be purified by recrystallization from trichloro-benzene or acetic acid anhydride. It forms yellow crystals dissolving in 60 per cent sulphuric acid to give a red solution. On allowing the sulphuric acid solution to stand, more quickly on warming, the product is decomposed and anthraquinone separates out.

The reaction product obtained in the manner described in the foregoing paragraph is introduced into 20 parts of water to which 5 parts of a caustic soda solution of 40° Bé. have been added and the whole boiled after the addition of 0.8 part of zinc dust by passing steam through the solution until all of the aniline is driven off. The reaction product is then filtered off and washed neutral with hot water. The reaction product is 9.10-dianilinoanthracene and identical with the product described in Example 6 and may be purified by recrystallization from organic solvents, such as for example trichlorobenzene and xylene. The formula corresponding to the product is

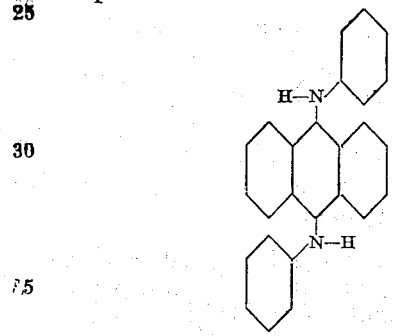

*Example 13*

1 part of pyridine and 2 parts of anhydrous aluminium chloride and 10 parts of p-toluidine are mixed with 1 part of anthraquinone, whereupon the whole is warmed for a short time at between 30° and 50° C. Then 0.5 part of zinc dust is gradually introduced into the reaction mixture which is again stirred for 1 hour at 80° C. 9.10-di-p-toluidoanthracene is obtained as a yellow red powder in a practically theoretical yield by pouring the reaction mixture in dilute acid.

*Example 14*

5 parts of anthraquinonedianil obtained as described in Liebig's Annalen, vol. 396, page 178, are dissolved in 100 parts of boiling amyl alcohol whereupon 3 parts of metallic sodium are added. The reduction is complete in a short time. The product thus obtained crystallizes from the reaction mixture on cooling. The product is identical with that obtained according to Example 12.

*Example 15*

4 parts of the dianil obtained by condensation of 1-chloranthraquinone and o-chloro-aniline by means of aluminium chloride are introduced into a solution of 7 parts of stannous chloride in 75 parts of aniline, whereupon the mixture is heated to boiling for a short time. On pouring the reaction mixture into dilute acid the reduction product separates out in the form of a brilliant yellow precipitate which may be recrystallized from amyl alcohol. The product is 9.10-di-o-chloranilino-1-chloroanthracene corresponding to the formula

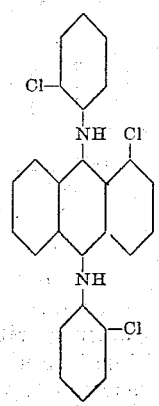

*Example 16*

2 parts of anhydrous aluminium chloride and 1.2 parts of anthraquinone-$\beta$-sulphonic acid sodium salt are added to 10 parts of aniline and the whole stirred for one hour at between 90° and 95° C. The excess of aniline is distilled off after the addition of caustic soda solution by means of steam whereupon the anthraquinonedianil-$\beta$-sulphonic acid sodium salt separates out as a red precipitate. It dissolves in dilute caustic alkali solution to give a deep red solution.

1 part of the dianil thus obtained is dissolved in from 5 to 10 parts of a dilute caustic soda solution and reduced by means of sodium hydrosulphite while warming. The sodium salt of 9.10-dianilino anthracene-$\beta$-sulphonic acid thus obtained corresponds to the formula

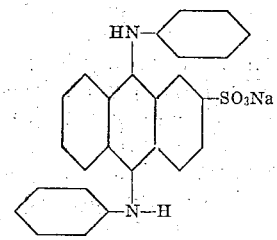

It is difficultly soluble in water and caustic soda solution and dyes wool from an acid bath yellow shades.

*Example 17*

5 parts of anthraquinonedianil are dissolved in 100 parts of concentrated sulphuric acid while cooling and reduced by means of 3 parts of copper powder. The reduction is completed in a very short time. On dilution of the reaction mixture by means of water the 9.10-dianilino anthracene separates out.

What we claim is:—

1. Anthracene substitution products having the general structure:

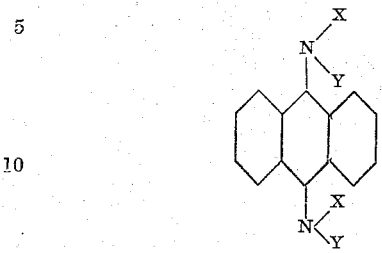

in which X stands for hydrogen, or an acyl radicle of the lower fatty acid series, and Y for hydrogen or an acyl radicle of the lower fatty acid series or a radicle of the benzene series, in which last case X must be hydrogen, which anthracene substitution products fluoresce when exposed to ultra-violet light and are readily decomposed to form anthraquinones.

2. Anthracene substitution products having the general structure:

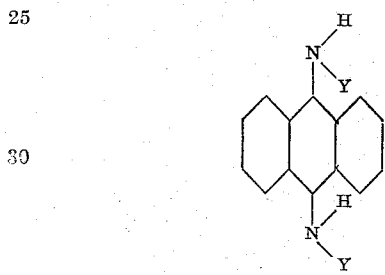

in which Y stands for a radicle of the benzene series, which anthracene substitution products are colored compounds, fluoresce when exposed to ultra-violet light and are readily decomposed to form anthraquinones.

3. 9.10-dianalino anthracene corresponding to the formula:

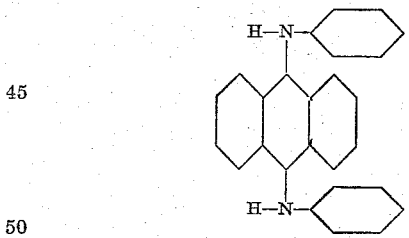

crystallizing from organic solvents in yellow needles which fluoresce when exposed to ultra-violet light and are decomposed to form anthraquinone when heated in 70 per cent sulphuric acid with an oxidizing agent.

4. 9.10-di-p-toluido-anthracene corresponding to the formula:

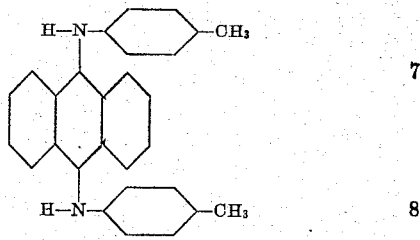

forming a yellow red powder, crystallizing from organic solvents, fluorescent when exposed to ultra-violet light and decomposing to form anthraquinone when heated in 70 per cent sulphuric acid with an oxidizing agent.

5. 1-chlor-9.10-di-o-chloroanilino anthracene corresponding to the formula:

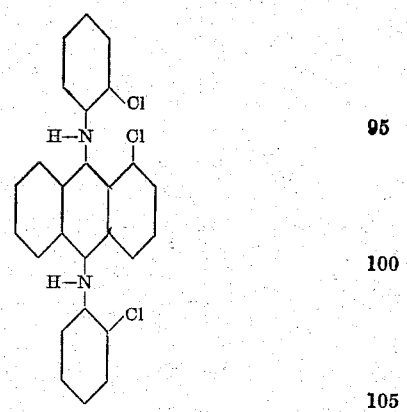

crystallizing from amyl alcohol in brilliant yellow crystals, fluorescent when exposed to ultra-violet light and decomposing to form 1-chloranthraquinone when heated in 70 per cent sulphuric acid with an oxidizing agent.

In testimony whereof we have hereunto set our hands.

MAX ALBERT KUNZ.
RUDOLF STROH.
HERMANN DIMROTH.